United States Patent
Ogawa

(12) 
(10) Patent No.: US 6,492,119 B1
(45) Date of Patent: Dec. 10, 2002

(54) HARD MACRO ARRAY

(75) Inventor: Masashi Ogawa, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/664,408

(22) Filed: Sep. 18, 2000

(30) Foreign Application Priority Data

Sep. 17, 1999 (JP) .......................................... 11-262924

(51) Int. Cl.[7] .......................... G01N 33/531; C12M 1/34; C12N 5/00
(52) U.S. Cl. ........................... 435/6; 435/969; 435/402; 435/401; 435/288.4; 436/518; 436/527; 436/155
(58) Field of Search ................................. 436/518, 527, 436/155; 435/969, 401, 402, 288.4, 6

(56) References Cited

U.S. PATENT DOCUMENTS 5,585,275 A * 12/1996 Hudson et al. ............. 436/518
6,037,186 A * 3/2000 Stimpson ................... 436/518
6,100,026 A * 8/2000 Nova et al. ..................... 435/6
6,124,137 A * 9/2000 Hutchens et al. ........... 436/155

OTHER PUBLICATIONS

Glazer et al. High Surface Area Substrates for DNA Arrays. Materials Research Society Symposium Proceddings, vol. 576, pp. 371–376. Apr. 1999.*

* cited by examiner

Primary Examiner—Gary Benzion
Assistant Examiner—J. Tung
(74) Attorney, Agent, or Firm—Sughrue Mion, PLLC

(57) ABSTRACT

A macro array comprises a film-shaped hard porous body and a plurality of spots, which contain test substances and are arrayed on the film-shaped hard porous body. The film-shaped hard porous body may be constituted of a surface layer region, which is provided with through-pores having a comparatively small mean pore diameter, and a base layer region, which is provided with through-pores having a comparatively large mean pore diameter. The surface of the film-shaped hard porous body, on which surface the spots are to be arrayed, may be coated with an auxiliary substance for promoting fixation of the test substances to the surface of the film-shaped hard porous body.

8 Claims, 1 Drawing Sheet

HARD MACRO ARRAY

BACKGROUND OF THE INVENTION

1. Field of the Invention

This invention relates to a macro array for use in molecular biology research, such as genetic expression analysis, medical fields, and other fields.

2. Description of the Related Art

Conventional macro arrays comprise a membrane and a plurality of spots (dots), which contain biopolymers, such as DNA's, and are arrayed (formed) on the membrane. With the macro arrays, multiple kinds of samples can be analyzed at one time on a single membrane. Therefore, the macro arrays are used widely in the molecular biology and the medical fields. For example, in cases where test substances are various kinds of genome DNA fragments, behavior of plurality of genes can be analyzed at one time by adding a probe, which has been prepared from total mRNA, or the like, onto the macro array and causing hybridization, or the like, to occur.

However, the conventional macro arrays are constituted by arraying spots, which contain test substances, such as DNA's, in good order on a polymeric organic membrane formed from nitrocellulose, or the like. Ordinarily, porous polymeric films, such as the nitrocellulose membranes, are markedly soft and apt to suffer from bending and creasing, which adversely affects the analytic operations, and the like. Therefore, in cases where the conventional macro arrays are subjected to hybridization, autoradiography, and the like, the operator must process and carry the membranes, which constitute the macro arrays, with the greatest possible care.

SUMMARY OF THE INVENTION

The primary object of the present invention is to provide a macro array, wherein a film-shaped material, which is not apt to suffer from bending and creasing, is employed as a base material, such that the macro array is easy to process.

The present invention provides a macro array, comprising a film-shaped hard porous body and a plurality of spots, which contain test substances and are arrayed on the film-shaped hard porous body.

The macro array in accordance with the present invention will hereinbelow often referred to as the hard macro array.

The term "film-shaped hard porous body" as used herein means the porous body formed from an inorganic compound (which may be, for example, a metal type of compound) into a film-shaped shape (typically, a film-shaped shape having a film thickness of at most 2 mm).

Also, the term "macro array" as used herein means the film-shaped body comprising the film-shaped hard porous body and a plurality of test substance-containing spots, which are arrayed (typically, in a matrix-like form) on the film-shaped hard porous body. Typically, the macro array may comprise the film-shaped hard porous body and a plurality of spots, which contain polynucleotide samples for genetic expression analysis, determination of a base sequence, variation analysis, polymorphism analysis, or the like, and which are arrayed on the film-shaped hard porous body. However, the purposes, for which the macro array in accordance with the present invention is used, are not limited to the applications described above. Specifically, the macro array in accordance with the present invention may comprise the film-shaped hard porous body and a plurality of spots of test substances, which may presumably contain substances (target substances) for the identification, analysis, or the like, of the target substances through chemical reactions or physical reactions, the spots being arrayed (typically, in a matrix-like form) on the film-shaped hard porous body.

Further, the term "test substance" as used herein means the substance to be analyzed on the macro array through hybridization or other techniques. Typically, the test substances may be biopolymers (i.e., polymeric electrolytes of the types constituting living bodies), such as polynucleotides, e.g. DNA's and RNA's, chemically synthesized oligonucleotides, and peptides. However, the test substances are not limited to the substances enumerated above. Specifically, the test substances may be various polymers and various monomers, which are capable of being adsorbed or fixed to the film-shaped hard porous body. (The polymers and monomers may be capable of being fixed to the film-shaped hard porous body such that they do not separate easily from the film-shaped hard porous body.)

The term "spot" as used herein means the visually perceptible or visually imperceptible fine point on the film-shaped hard porous body, at which point the test substance, such as the biopolymer, is adsorbed or fixed.

In the hard macro array in accordance with the present invention, the base material, on which the test substance-containing spots are formed, is the film-shaped hard porous body. Therefore, the advantages over the conventional macro arrays, in which polymer types of porous membranes are utilized as the base materials, can be obtained in that the film-shaped hard porous body are not apt to suffer from bending and creasing as in the cases of the polymer types of porous membranes having a markedly high softness. Therefore, the operator need not pay close attention to the prevention of bending and creasing of the film-shaped hard porous body and is capable of more easily processing the hard macro array in accordance with the present invention than in the conventional macro arrays.

Also, with the hard macro array in accordance with the present invention, wherein the base material is constituted of the film-shaped hard porous body, when the test substance-containing sample is applied drop-wise (i.e., spotted) onto the film-shaped hard porous body, part of the test substance-containing sample is capable of permeating to the interior of the pore. Therefore, the test substance-containing sample having been spotted can be restricted from diffusing horizontally on the surface of the base material (i.e., the film-shaped hard porous body). As a result, the diameter of the spot formed on the surface of the base material can be kept small. Accordingly, with the hard macro array in accordance with the present invention, the comparatively small spots can be arrayed at a high density.

In the hard macro array in accordance with the present invention, the film-shaped hard porous body should preferably be constituted of a surface layer region, which is provided with through-pores having a comparatively small mean pore diameter, and a base layer region, which is provided with through-pores having a comparatively large mean pore diameter. The term "surface layer region" as used herein means the surface layer region of the base material containing the surface on which the spots are formed and arrayed. The term "base layer region" as used herein means the layer region, which is adjacent to the surface layer region with respect to the direction of the film thickness of the film-shaped hard porous body. With the hard macro array in accordance with the present invention, wherein the film-shaped hard porous body is constituted of the surface layer region, which is provided with the through-pores having a comparatively small mean pore diameter, and the base layer region, which is provided with through-pores having the comparatively large mean pore diameter, the test substance applied onto the surface of the surface layer region is apt to remain on the surface of the surface layer region due to the comparatively small pore diameters of the pores in the surface layer region. Also, a solvent, such as water, which is contained in the applied spot and enters into the pores in the surface layer region, is capable of being quickly introduced toward the bottom surface side of the film-shaped hard porous body via the pores larger than the pores of the surface layer region. Therefore, the formation of the spots can be performed efficiently.

Further, in the hard macro array in accordance with the present invention, a surface of the film-shaped hard porous body, on which surface the spots are to be arrayed, should preferably be coated with an auxiliary substance for promoting fixation of the test substances to the surface of the film-shaped hard porous body. With the hard macro array in accordance with the present invention, wherein the surface of the film-shaped hard porous body is coated with the auxiliary substance, the efficiency, with which the test substances are fixed to the surface of the inorganic type of film-shaped hard porous body, can be enhanced.

The hard macro array in accordance with the present invention has a higher hardness than the hardness of the conventional macro arrays, in which polymeric organic membranes are employed as the base materials. Therefore, the hard macro array in accordance with the present invention is easy to process, and careless bending, creasing, or the like, can be prevented from occurring. Also, with the hard macro array in accordance with the present invention, the operator is capable of being released from feeling of tension and stress at the time of the operation for hybridization, autoradiography, or the like. Further, with the hard macro array in accordance with the present invention, operation characteristics can be enhanced, and therefore the processing, such as hybridization or autoradiography, is capable of being performed efficiently and smoothly.

The present invention will hereinbelow be described in further detail with reference to the accompanying drawings.

DETAILED DESCRIPTION OF THE INVENTION

Figure 1:
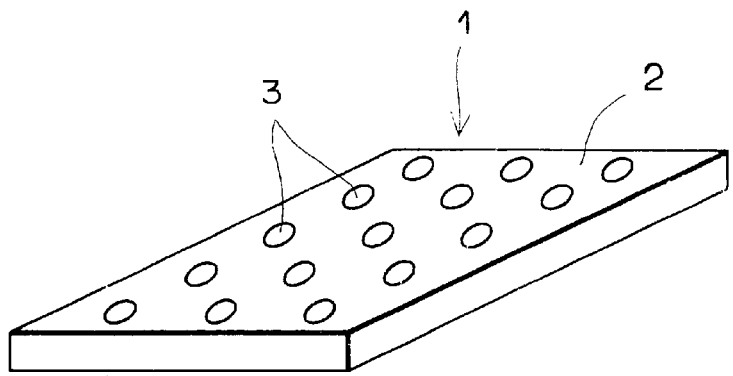
FIG. 1 is an explanatory perspective view showing an example of the hard macro array in accordance with the present invention.

The hard macro array in accordance with the present invention may be prepared and utilized in the manner described below.

As the film-shaped hard porous body acting as the base material in the hard macro array in accordance with the present invention, a ceramic type of porous film, which is ordinarily utilized as a filtering medium, may be utilized preferably. The ceramic type of porous film may be produced by adding an appropriate binder to aggregate of alumina, aluminosilicate, zirconia, silicon carbide, silicon nitride, boron carbide, carbon, or the like, molding the resulting mixture, and baking the molded material at a high temperature falling within the range of 500° C. to 800° C. or falling within the range of 1,100° C. to 1,200° C. Examples of typical processes for producing the ceramic type of porous film include a separate-phase technique and a sol-gel technique.

For example, with the separate-phase technique, raw materials, such as siliceous sand, soda ash, and boric acid, are mixed together, and the resulting mixture is fused with stirring (typically, at a temperature falling within the range of 1,200° C. to 1,400° C.). The fused mixture is then molded under high temperature conditions of approximately 800° C. to approximately 1,100° C., and a vitreous material (silicate glass, or the like), which has not yet been separated into phases, is thereby obtained. The vitreous material is then subjected to phase separation with heat treatment at a temperature falling within the range of approximately 500° C. to approximately 650° C. Thereafter, heat treatment and baking are performed to produce a porous ceramic material, such as silicate glass. With the separate-phase technique, a porous film having a narrow pore diameter distribution (i.e., little variation in pore diameter) can be formed.

With the sol-gel technique, a sol-like material is formed by hydrolyzing various metal alkoxides, such as $Si(OC_2H_5)_4$ and $Zr(OC_3H_7)_4 \cdot 2C_3H_7OH$, and is molded into a desired shape. The molded material is then subjected to gelation, heat treatment (typically at a temperature of 150° C.), and baking (typically at a temperature falling within the range of 500° C. to 800° C.). In this manner, a porous ceramic material is produced. With the sol-gel technique, porous thin films of various element compositions can be formed. The separate-phase technique and the sol-gel technique themselves are well known in the inorganic chemical industry.

In the hard macro array in accordance with the present invention, the film-shaped hard porous body acting as the base material should preferably be formed such that the mean pore diameter of the pores at the surface, on which the spots are arrayed, falls within the range of 0.1 $\mu$m to 20 $\mu$m. The film-shaped hard porous body employed in the hard macro array in accordance with the present invention should more preferably have approximately uniform pore diameter. With the film-shaped hard porous body having the mean pore diameter falling within the range described above, biopolymers, such as polynucleotides, and other test substances can easily remain on the surface of the porous body, and solvents, such as water, can be discharged easily. Therefore, spots of a small diameter can be formed at a high density on the surface of the porous body. If the mean pore diameter of the pores at the surface, on which the spots are arrayed, is smaller than the range described above, the spotted sample will diffuse on the surface of the film-shaped hard porous body. If the mean pore diameter of the pores at the surface, on which the spots are arrayed, is larger than the range described above, a large amount of sample will permeate into the pores, and therefore the sample cannot be utilized efficiently.

In the hard macro array in accordance with the present invention, the film thickness of the film-shaped hard porous body may be set at arbitrary values, such that the operation characteristics of the macro array are not affected adversely. The film-shaped hard porous body may have a film thickness such that the film-shaped hard porous body is capable of being processed in the same manner as that in the conventional polymeric organic membrane. From the view point of the processing convenience and prevention of marked brittleness and weakness, the film-shaped hard porous body may have a film thickness falling within the range of 10 $\mu$m to 2,000 $\mu$m, and should preferably have a film thickness falling within the range of 20 μm to 200 μm. However, the film thickness of the film-shaped hard porous body is not limited to the range described above.

As the film-shaped hard porous body of the hard macro array in accordance with the present invention, besides the ceramic type of porous film described above, it is also possible to employ a metal type of filtering medium, such as a metal mesh laminate type of filter, which is obtained by sintering powder, metal meshes, long fibers, short fibers, or the like, of stainless steel.

Figure 2:
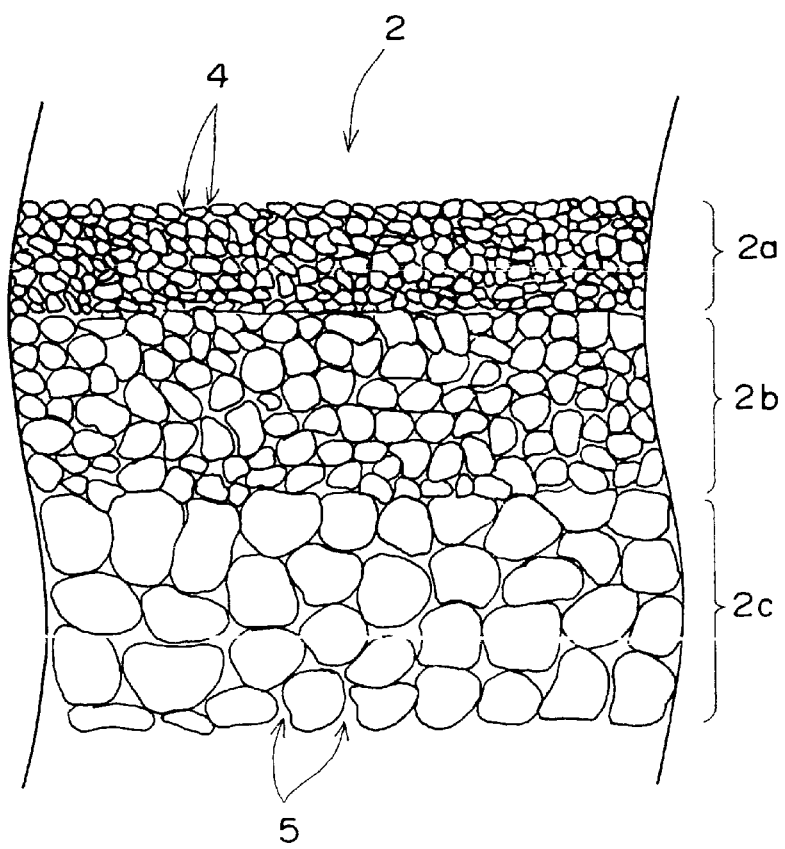
FIG. 2 is an explanatory sectional view showing a film-shaped hard porous body employed in the example of the hard macro array in accordance with the present invention.

As the film-shaped hard porous body, a porous body having a double-layer structure constituted of a surface layer region, which is provided with pores having a comparatively small mean pore diameter, and a base layer region, which is provided with pores having a comparatively large mean pore diameter, may be employed. For example, as illustrated in FIG. 2, a film-shaped hard porous body 2 having a double-layer structure may be constituted of a surface layer region 2a, which is provided with pores having a comparatively small mean pore diameter (e.g., falling within the range of 0.1 μm to 1.0 μm), and a base layer region (composed of regions 2b and 2c), which is provided with pores having a comparatively large mean pore diameter (e.g., falling within the range of 1.0 μm to 200 μm). The film-shaped hard porous body 2 is capable of being preferably employed as the film-shaped hard porous body. The base layer region may be composed of at least two layers having different mean pore diameters. For example, as illustrated in FIG. 2, the base layer region may be composed of a middle-position base layer region 2b, which is provided with pores having a mean pore diameter falling within the range of 1.0 μm to 20 μm, and a bottom-position base layer region 2c, which is provided with pores having a mean pore diameter falling within the range of 20 μm to 200 μm. The film-shaped hard porous body 2, which is constituted of the surface layer region 2a, the middle-position base layer region 2b, and the bottom position base layer region 2c, is also preferable as the film-shaped hard porous body. With the film-shaped hard porous body 2 constituted of the surface layer region 2a and the base layer region (2b, 2c), the test substances, such as polynucleotides, are capable of being easily caught by the surface layer region 2a. Also, the solvent, such as water, which has passed through the surface layer region 2a, is capable of being quickly discharged through the pores in the base layer region (2b, 2c), which pores have a large mean pore diameter, to the exterior of the film-shaped hard porous body 2. The film-shaped hard porous body, which is composed of multiple layers having different pore diameters, can be obtained by forming a film-shaped hard porous body of a single-layer structure with the separate-phase technique or the sol-gel technique described above, and coating a ceramic thin film as a surface layer on the surface of the thus formed film-shaped hard porous body of the single-layer structure. Specifically, for example, a predetermined coating composition may be prepared by mixing alumina fine particles, glass powder, and an appropriate binder. The film-shaped hard porous body of the single-layer structure may then be dipped in the coating composition, and the surface of the film-shaped hard porous body of the single-layer structure may thereby be coated with the coating composition. Thereafter, the film-shaped hard porous body having been coated with the coating composition may be subjected drying, baking, and the like. In this manner, a porous thin film (i.e., the surface layer region) may be formed on the surface of the film-shaped hard porous body of the single-layer structure. The technique for forming the thin film is well known in the inorganic chemical industry.

For the reasons described above, the surface of the film-shaped hard porous body acting as the base material of the hard macro array in accordance with the present invention, on which surface the spots are to be formed and arrayed, should preferably be previously coated with the auxiliary substance for promoting the fixation of the test substances. As the auxiliary substance, one of various substances capable of promoting adsorption and fixation of the test substances may be employed. For example, in cases where the test substances are biopolymers, such as polynucleotides and proteins, as the auxiliary substance, it is possible to employ a high-molecular weight compound having a carbodiimido group, an organic compound (an organic polysilane, or the like) having an aldehyde group, such as glutaraldehyde, or a cationic polymer, such as polylysine [poly(Lys)]. In cases where the surface of the film-shaped hard porous body is coated with the auxiliary substance, the adsorption and the fixation of the biopolymer to the film-shaped hard porous body through ionic bonding, hydrophobic bonding, physical adsorption, or the like, are capable of being promoted.

How the test substance-containing spots are formed on the film-shaped hard porous body will be described hereinbelow. With the hard macro array in accordance with the present invention, spots having various values of diameters are capable of being formed, depending upon the pore diameters of the pores in the film-shaped hard porous body. Typically, the spots may be formed such that the diameter of a single spot falls within the range of 50 μm to 400 μm. The spots should preferably be formed such that the diameter of a single spot falls within the range of 50 μm to 200 μm. The spots should more preferably be formed such that the diameter of a single spot falls within the range of 50 μm to 100 μm. The formation of the fine spots may be performed with one of commercially available various types of array forming spotter devices. The spotter device may be selected from various spotter devices, which are provided with a mechanism capable of spotting an extremely small amount (typically, at most 1 μl) of a sample. For example, it is possible to utilize a spotter device for forming a micro array, which is used for forming an array of spots on a surface of an ordinary slide glass. For example, orifices of a plurality of (e.g., 24×36) extremely thin capillaries or pins, which are arrayed in a lattice-like form and filled with samples containing polynucleotides, such as DNA's, may be located close to or brought into contact with the film-shaped hard porous body, and the samples may thereby be spotted to the surface of the film-shaped hard porous body from the extremely thin capillaries or pins.

With the hard macro array in accordance with the present invention, as in the cases of the conventional macro arrays, it is necessary for the test substances in the test substance-containing spots to be fixed on the film-shaped hard porous body at least for a predetermined period. For example, in cases where the biopolymers acting as the test substances are polynucleotides, such as DNA's and RNA's, after samples containing the polynucleotides (typically, dissolved in a buffer, such as 2×SSC) have been spotted onto the film-shaped hard porous body, the polynucleotides contained in the spotted samples may be fixed on the film-shaped hard porous body with baking processing (heat drying processing), ultraviolet ray irradiation processing, or the like. For example, after the polynucleotide-containing samples have been spotted onto the film-shaped hard porous body, ultraviolet rays of approximately 120 kJ are irradiated to the film-shaped hard porous body. With the irradiation of the ultraviolet rays, the polynucleotides contained in the dropped samples can be efficiently fixed to the surface of the film-shaped hard porous body. Particularly, in cases where the surface of the film-shaped hard porous body has been coated with the auxiliary substance, the adsorbing and fixing capability can be enhanced.

EXAMPLE

FIG. 1 is an explanatory perspective view showing a hard macro array 1 in accordance with the present invention. As illustrated in FIG. 2, the hard macro array 1 comprised an alumina-based ceramic type of film-shaped hard porous body 2 having a multi-layer structure, which acts as a base material. The film-shaped hard porous body 2 comprised a surface layer region 2a (film thickness: approximately 20 μm), which was provided with approximately uniform fine pores 4, 4, . . . having a mean pore diameter of approximately 0.2 μm. The film-shaped hard porous body 2 also comprised a middle-position base layer region 2b (film thickness: approximately 20 μm), which was provided with approximately uniform fine pores having a mean pore diameter of approximately 10 μm. The film-shaped hard porous body 2 further comprised a bottom-position base layer region 2c (film thickness: approximately 1,000 μm), which was provided with approximately uniform fine pores 5, 5, . . . having a mean pore diameter of approximately 100 μm.

The ceramic type of film-shaped hard porous body 2 was previously dipped in a polylysine solution, and the surface of the film-shaped hard porous body 2 was thereby coated with the polylysine. Thereafter, as illustrated in FIG. 1, a plurality of spots 3, 3, . . . containing various DNA fragments as test substances were formed on the surface of the surface layer region 2a. Specifically, a spotter device provided with a plurality of extremely thin capillaries was utilized, and orifices of the extremely thin capillaries were brought into contact with the surface of the surface layer region 2a. In this manner, solutions containing the DNA fragments were spotted onto the surface of the surface layer region 2a. As a result, as illustrated in FIG. 1, the spots 3, 3, . . . , which were constituted of the solutions containing the DNA fragments and had a diameter of approximately 200 μm, were arrayed at intervals of approximately 200 μm and in a matrix-like form and in a mutually separated state. Specifically, 600 to 700 spots 3, 3, . . . could be formed at a high density within a 1cm×1 cm square region. In the explanatory view of FIG. 1, the spots 3, 3, . . . are indicated by the solid lines. However, actually, as will be understood by the experts in the art, the spots 3, 3, . . . containing nucleic acid are visually imperceptible.

Thereafter, ultraviolet rays (of 120 kJ) were irradiated to the surface of the surface layer region 2a of the film-shaped hard porous body 2. In this manner, the DNA fragments were fixed on the surface of the surface layer region 2a of the film-shaped hard porous body 2.

Thereafter, an ordinary hybridization operation was performed by utilizing a probe having been obtained by labeling a single stranded DNA, which is complementary with part of the DNA fragments (i.e., with a target substance), with $^{32}$P. Also, autoradiography was then performed. As a result, a specific signal could be detected at the spot containing the target substance. In this manner, with the hard macro array 1 in accordance with the present invention, as with the conventional macro arrays provided with polymeric organic membranes as the base materials, the target substance could be detected and analyzed from the plurality of test substances (spots).

In addition, all of the contents of Japanese Patent Application No. 11(1999)-262924 are incorporated into this specification by reference.

What is claimed is:

1. A macro array comprising a planar-shaped hard porous body and a plurality of spots, wherein the spots contain test substances and are arrayed on the planar-shaped hard porous body, wherein the planar-shaped hard porous body is constituted of a surface layer region, which is provided with through-pores having a first mean pore diameter, and first base layer region, which is provided with through-pores having a second mean pore diameter, wherein the second mean pore diameter wherein the first mean pore diameter is in a range of 0.1 micrometers to 1.0 micrometers and wherein the second mean pore diameter is in a range of 1.0 micrometers to 200 micrometers is larger than the first mean pore diameter.

2. A macro array as defined in claim 1, wherein a surface of the surface layer region on which the spots are arrayed is coated with an auxiliary substance for fixing the test substances to the surface of the surface layer region.

3. A macro array as defined in claim 1, wherein the hard porous body comprises a second base layer region having through pores having a third mean pore diameter, wherein the third mean pore diameter is larger than said second mean pore diameter.

4. A macro array as defined in claim 3, wherein the first mean pore diameter is in a range of 0.1 to 1.0 micrometers, the second mean pore diameter is in a range of 1.0 to 20 micrometers, and the third mean pore diameter is in a range of 20.0 to 200 micrometers.

5. A macro array as defined in claim 1, wherein a surface of the surface layer region on which the spots are arrayed is coated with an auxiliary substance for fixing the test substances to the surface of the surface layer region.

6. A macro array as defined in claim 4, a surface of the surface layer region on which the spots are arrayed is coated with an auxiliary substance for fixing the test substances to the surface of the surface layer region.

7. A macro array as defined in claim 1, wherein the surface layer region is in physical contact with the first base layer region to provide a layered structure.

8. A macro array as defined in claim 4, wherein the surface layer region is in physical contact with the first base layer region and the first base layer region is in physical contact with the second base layer region to provide a layered structure.

* * * * *